United States Patent
Inao et al.

(10) Patent No.: US 9,598,030 B2
(45) Date of Patent: Mar. 21, 2017

(54) WIRE HARNESS HAVING A COVER MEMBER CONFIGURED TO PROVIDE DRAINAGE WHILE SHIELDING ENTRY OF FOREIGN SUBSTANCES

(71) Applicant: Yazaki Corporation, Minato-ku, Tokyo (JP)

(72) Inventors: Shinichi Inao, Makinohara (JP); Tatsuya Oga, Makinohara (JP); Hideomi Adachi, Makinohara (JP)

(73) Assignee: Yazaki Corporation, Minato-ku, Tokyo (JP)

(*) Notice: Subject to any disclaimer, the term of this patent is extended or adjusted under 35 U.S.C. 154(b) by 0 days.

(21) Appl. No.: 14/899,726

(22) PCT Filed: Jun. 19, 2014

(86) PCT No.: PCT/JP2014/066349
§ 371 (c)(1),
(2) Date: Dec. 18, 2015

(87) PCT Pub. No.: WO2014/203980
PCT Pub. Date: Dec. 24, 2014

(65) Prior Publication Data
US 2016/0144807 A1 May 26, 2016

(30) Foreign Application Priority Data

Jun. 20, 2013 (JP) ................................. 2013-129289

(51) Int. Cl.
*B60R 16/02* (2006.01)
*H02G 3/04* (2006.01)

(52) U.S. Cl.
CPC ....... *B60R 16/0215* (2013.01); *H02G 3/0468* (2013.01)

(58) Field of Classification Search
None
See application file for complete search history.

(56) References Cited

U.S. PATENT DOCUMENTS 5,615,851 A * 4/1997 LeBeau .................... F16B 2/185
248/73
5,846,467 A * 12/1998 Saito .................... B60R 16/0222
264/263

(Continued)

FOREIGN PATENT DOCUMENTS

CN 1226097 A 8/1999
CN 101682182 A 3/2010

(Continued)

OTHER PUBLICATIONS

Dec. 30, 2015—(WO) IPRP—App PCT/JP2014/066349.

(Continued)

*Primary Examiner* — Chau N Nguyen
*Assistant Examiner* — Muhammad Azam
(74) *Attorney, Agent, or Firm* — Banner & Witcoff, Ltd.

(57) ABSTRACT

A wire harness (9) includes an exterior member (16) with a tubular shape which covers a high-voltage conductive path (15), and a drain hole (27) is formed in the exterior member (16). The drain hole (27) is covered with a clamp (20), that is, a post-installed member in a state that the function of the drain hole is ensured. The clamp (20) includes a tube attachment portion (32), and the tube attachment portion (32) includes a drain function ensuring portion (34). A gap (35) is formed between the drain hole (27) and the clamp (20). A foreign substance entry preventing portion (36) is formed in a side of the gap (35) in a vehicle progress direction P. An outside communication hole (37) is formed in an opposite side in the vehicle progress direction P.

5 Claims, 4 Drawing Sheets

(56) References Cited

U.S. PATENT DOCUMENTS

| | | | |
|---|---|---|---|
| 6,166,327 A | 12/2000 | Saito et al. | |
| 6,338,637 B1* | 1/2002 | Muench, Jr. | H01R 13/53 |
| | | | 439/201 |
| 6,417,451 B1* | 7/2002 | Uchiyama | B60R 16/0215 |
| | | | 174/72 A |
| 6,488,053 B1* | 12/2002 | Tadokoro | H02G 3/0468 |
| | | | 138/110 |
| 6,708,933 B2* | 3/2004 | Girodo | B60R 16/0215 |
| | | | 24/327 |
| 7,189,918 B2 | 3/2007 | Sakata | |
| 8,309,847 B2 | 11/2012 | Aburaya et al. | |
| 2001/0006113 A1* | 7/2001 | Mori | B60R 16/0222 |
| | | | 174/72 A |
| 2004/0026577 A1* | 2/2004 | Yasuda | B60R 16/0215 |
| | | | 248/74.3 |
| 2004/0107533 A1* | 6/2004 | Nishihara | B60R 16/0222 |
| | | | 16/2.1 |
| 2004/0222007 A1* | 11/2004 | Nakamrura | B60R 16/0207 |
| | | | 174/650 |
| 2005/0056442 A1* | 3/2005 | Santanda | H02G 3/34 |
| | | | 174/481 |
| 2005/0115727 A1* | 6/2005 | Sakata | B60R 16/0239 |
| | | | 174/17 VA |
| 2005/0139372 A1* | 6/2005 | Matsui | B60R 16/0222 |
| | | | 174/650 |
| 2005/0264033 A1* | 12/2005 | Aoki | B60R 16/0215 |
| | | | 296/155 |
| 2006/0243868 A1* | 11/2006 | Nakamura | G02B 6/3616 |
| | | | 248/113 |
| 2007/0102182 A1* | 5/2007 | Okada | H02G 3/0468 |
| | | | 174/68.1 |
| 2007/0148994 A1* | 6/2007 | Sato | B60R 16/0215 |
| | | | 439/34 |
| 2008/0009175 A1* | 1/2008 | Kamenoue | B60R 16/0222 |
| | | | 439/397 |
| 2008/0185169 A1* | 8/2008 | Daito | H01B 7/285 |
| | | | 174/23 R |
| 2010/0043225 A1* | 2/2010 | Oga | B60R 16/0207 |
| | | | 29/857 |
| 2010/0230128 A1 | 9/2010 | Aburaya et al. | |
| 2011/0083899 A1* | 4/2011 | Mori | B60R 16/0215 |
| | | | 174/72 A |
| 2011/0132638 A1* | 6/2011 | Oga | H02G 3/0462 |
| | | | 174/135 |
| 2011/0147078 A1* | 6/2011 | Satou | B60R 16/0215 |
| | | | 174/72 A |
| 2012/0217036 A1* | 8/2012 | Kuriyagawa | H01B 7/28 |
| | | | 174/110 R |
| 2013/0008711 A1* | 1/2013 | Toyama | B60R 16/0215 |
| | | | 174/70 R |
| 2013/0199823 A1* | 8/2013 | Kanai (Popovici) | B60R 16/0222 |
| | | | 174/152 G |
| 2015/0180216 A1* | 6/2015 | Suzuki | H02G 3/088 |
| | | | 174/70 C |

FOREIGN PATENT DOCUMENTS

| | | |
|---|---|---|
| JP | H06-276643 A | 9/1994 |
| JP | H08-167444 A | 6/1996 |
| JP | 2005-132165 A | 5/2005 |
| JP | 2007-012519 A | 1/2007 |
| JP | 2012-016219 A | 1/2012 |

OTHER PUBLICATIONS

Sep. 9, 2014—International Search Report—Intl App PCT/JP2014/066349.

Dec. 5, 2016—(CN) Notification of the First Office Action—App 201480034676.0.

* cited by examiner

WIRE HARNESS HAVING A COVER MEMBER CONFIGURED TO PROVIDE DRAINAGE WHILE SHIELDING ENTRY OF FOREIGN SUBSTANCES

TECHNICAL FIELD

The present invention relates to a wire harness that is configured to include an exterior member having a drain hole.

BACKGROUND ART

A wire harness is configured to include one or a plurality of conductive paths through which devices are electrically connected to each other, and an exterior member that covers and protects the conductive paths. A drain hole is formed in the wire harness disclosed in PTL 1 in such a way that moisture infiltrating into the exterior member is allowed to drain to the outside therethrough. The drain hole of the exterior member is disposed at the lowest end when the wire harness is routed.

CITATION LIST

Patent Literature

[PTL 1] JP-A-6-276643

SUMMARY OF INVENTION

Technical Problem

The exterior member adopted in the related art has the drain hole for draining moisture to the outside, and is formed in such a way that the drain hole is exposed, and thus when being routed along a vehicle underfloor, the wire harness has a problem in that grit or the like enters the inside of the exterior member via the drain hole. When grit or the like enters the inside of the exterior member, the wire harness has a problem in that the external surface of the conductive path is scratched due to vibration or the like during traveling.

The present invention is made in light of this problem, and an object of the present invention is to provide a wire harness capable of preventing foreign substances from entering the inside of an exterior member.

Solution to Problem

In order to achieve this object, a wire harness according to the present invention has characteristics in (1) to (5) hereinbelow.

(1) A wire harness includes an exterior member with a tubular shape which covers a conductive path, a drain hole being formed in the exterior member, the drain hole is covered with a post-installed member attached to the exterior member in a state that a drain function is ensured.

According to the present invention having such a characteristic, the post-installed member such as a clamp or a band is attached to the exterior member at the position of the drain hole. The drain hole is covered with the post-installed member, and thus foreign substances from the outside are prevented from entering the inside of the exterior member.

(2) In the wire harness described in (1), a gap is formed between the drain hole and the post-installed member.

According to the present invention having such a characteristic, it is possible to drain moisture to the outside via the gap formed between the drain hole and the post-installed member even if the drain hole is covered with the post-installed member. That is, the function of the drain hole is ensured.

(3) In the wire harness described in (2), a foreign substance entry preventing portion is formed in a side of the gap in a vehicle progress direction.

According to the present invention having such a characteristic, the gap is formed, and the foreign substance entry preventing portion is formed in a side in the vehicle progress direction. As a result, foreign substances are prevented from entering the gap during traveling. The foreign substance entry preventing portion may be any portion shaped so as to have a closed end in the vehicle progress direction.

(4) In the wire harness described in (3), an outside communication hole is formed in an opposite side in the vehicle progress direction.

According to the present invention having such a characteristic, the outside communication hole is formed in a side opposite to the foreign substance entry preventing portion, and thus moisture is drained to the gap via the drain hole, to the outside communication hole, and then to the outside.

(5) In the wire harness described in (1), a hole or a slit smaller than the drain hole is formed in a portion of the post-installed member which corresponds to the drain hole.

According to the present invention having such a characteristic, it is possible to drain moisture to the outside via the hole or the slit formed in the portion of the post-installed member corresponding to the drain hole even if the drain hole is covered with the post-installed member. The hole or the slit is smaller than the drain hole, and thus the function of the drain hole is ensured.

Advantageous Effects of Invention

According to (1), the drain hole is covered with the post-installed member in the state that the function of the drain hole is ensured, and thus it is possible to prevent foreign substances from entering the inside of the exterior member, and to prevent the conductive path from being damaged.

According to (2), the gap is formed between the drain hole and the post-installed member, and thus it is possible to ensure the function of the drain hole by virtue of the gap.

According to (3), since the foreign substance entry preventing portion is so formed as to face the vehicle progress direction, even if the gap is present between the drain hole and the post-installed member, it is possible to prevent foreign substances from entering the gap, and to prevent foreign substances from entering the inside of the exterior member.

According to (4), the outside communication hole is formed, and thus it is possible to reliably drain moisture to the outside via the outside communication hole.

According to (5), the hole or the slit smaller than the drain hole is formed in a portion of the post-installed member corresponding to the drain hole, and thus it is possible to ensure the function of the drain hole by the hole or the slit.

DESCRIPTION OF EMBODIMENTS

A wire harness includes an exterior member with a tubular shape which covers one or a plurality of conductive paths, and a drain hole is formed in the exterior member. In order to prevent foreign substances from entering the inside of the exterior member via the drain hole, the wire harness is configured such that a post-installed member covers the drain hole in a state that the function of the drain hole is ensured.

Embodiment 1

Figure 1:
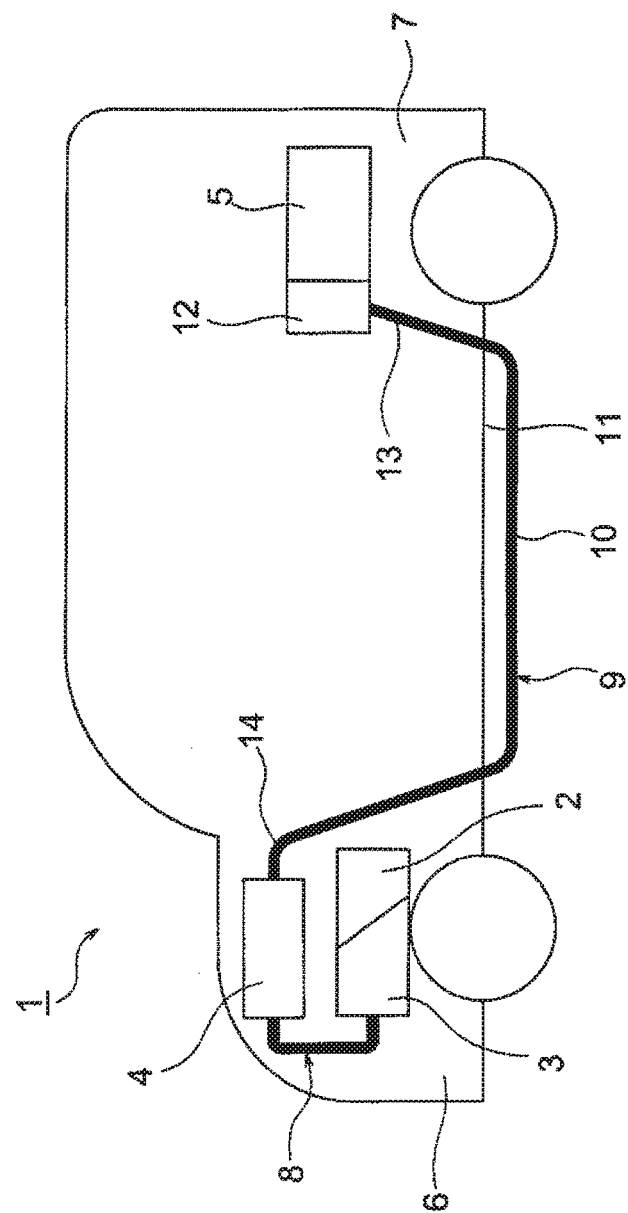
FIG. 1 is a view schematically illustrating a routing state of a wire harness in Embodiment 1 of the present invention.
Figure 2:
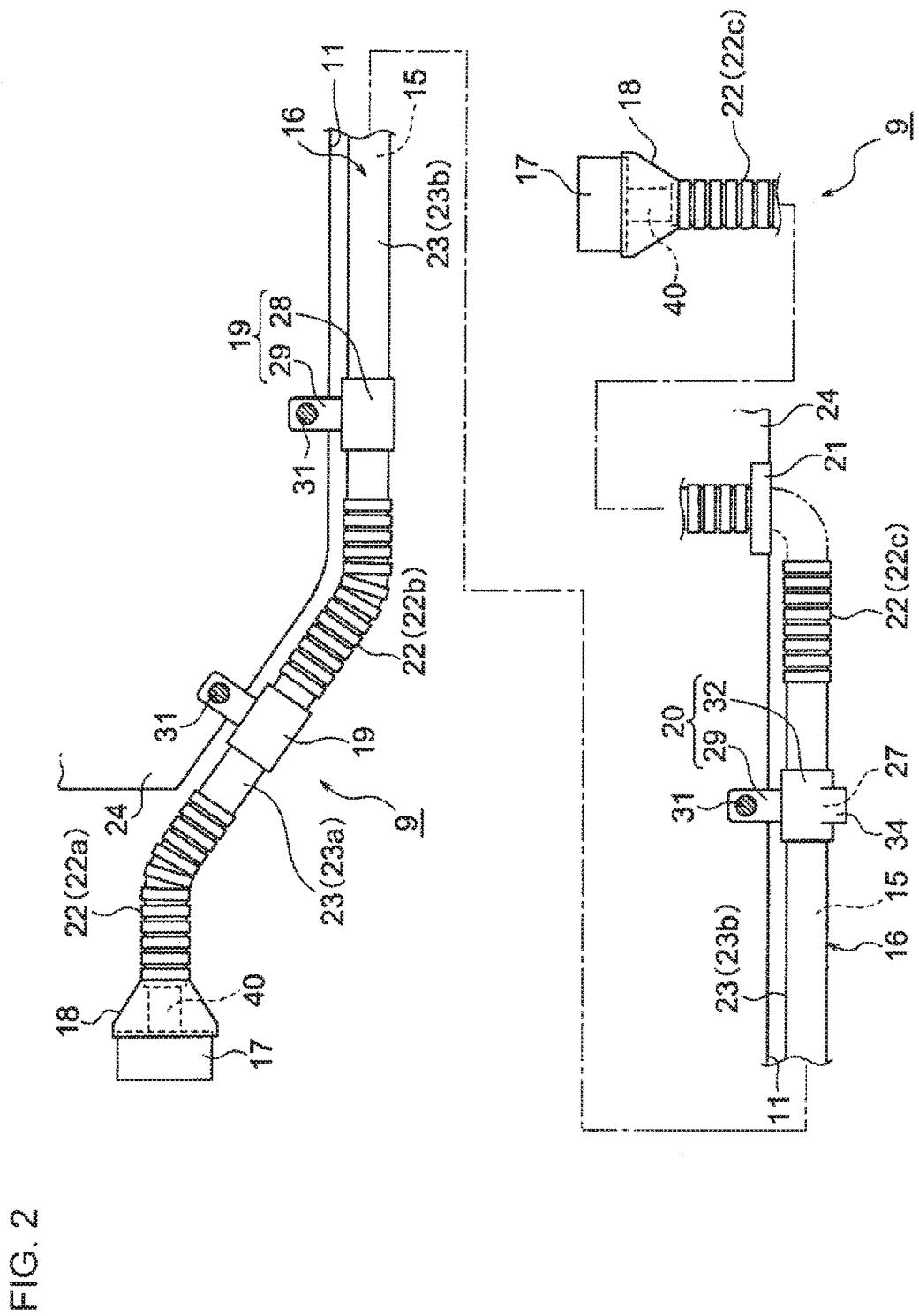
FIG. 2 is a view illustrating a state in which the wire harness is attached and fixed to a vehicle.
Figure 3:
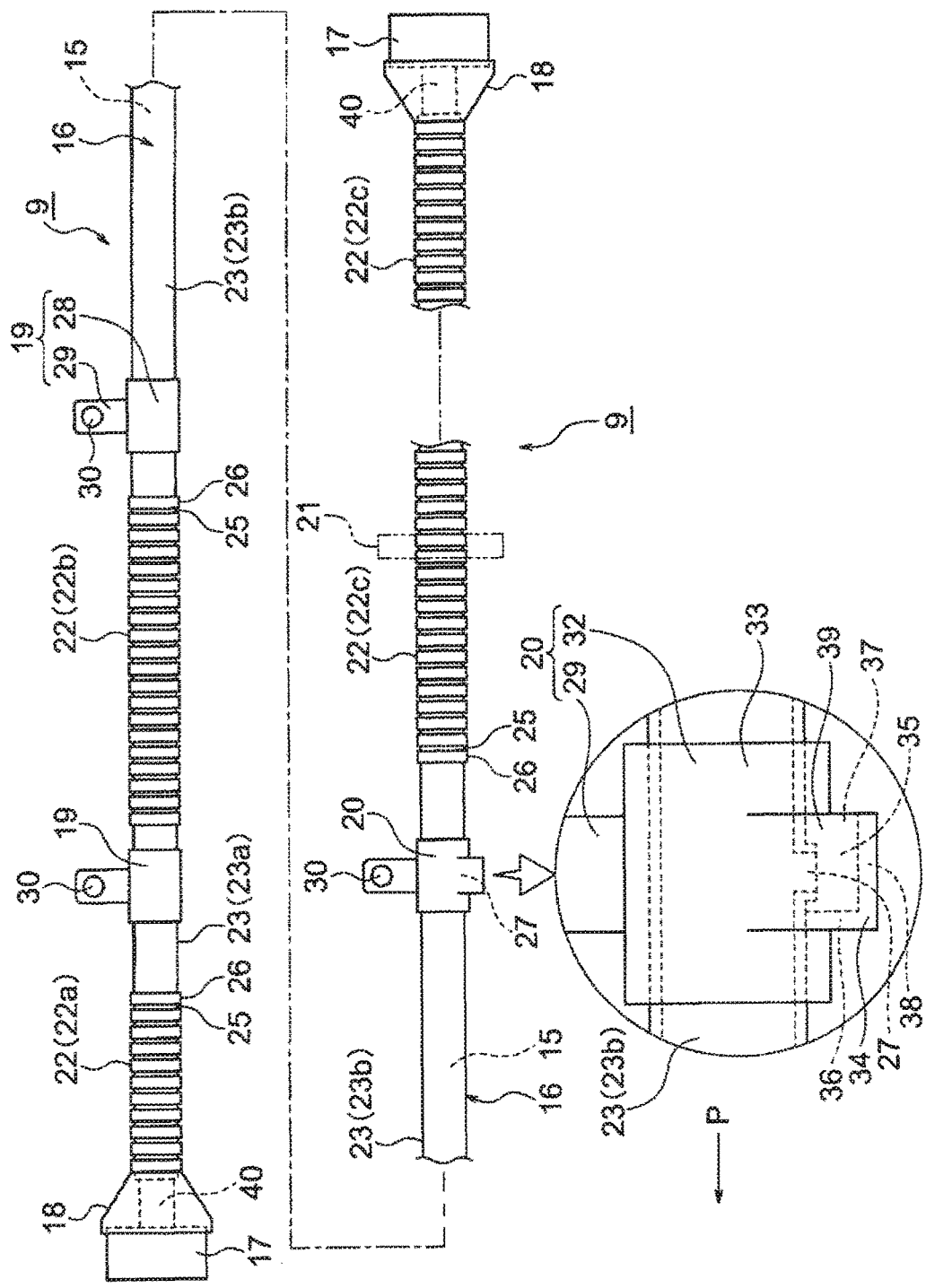
FIG. 3 is a view illustrating a configuration and a drain structure of the wire harness.

Hereinafter, Embodiment 1 will be described with reference to the accompanying drawings. FIG. 1 is a view schematically illustrating a routing state of a wire harness in Embodiment 1 of the present invention. FIG. 2 is a view illustrating a state in which the wire harness is attached and fixed to a vehicle, and FIG. 3 is a view illustrating the configuration and the drain structure of the wire harness.

In the embodiment, the present invention is applied to a wire harness to be routed in a hybrid vehicle (which may be an electric vehicle or a typical automobile).

In FIG. 1, a hybrid vehicle 1 includes two power sources, that is, an engine 2 and a motor unit 3, and is driven by a combination of power from these power sources. Electric power is supplied from a battery (battery pack) 5 to the motor unit 3 via an inverter unit 4. In the embodiment, the engine 2, the motor unit 3, and the inverter unit 4 are mounted in an engine compartment 6 in the vicinity of the front wheels. The battery 5 is mounted in a vehicle rear portion 7 in the vicinity of the rear wheels (may be mounted in a vehicle interior that is present on the rear side of the engine compartment 6).

The motor unit 3 is connected to the inverter unit 4 via a high-voltage wire harness 8. The battery 5 is connected to the inverter unit 4 via a high-voltage wire harness 9. An intermediate portion 10 of the wire harness 9 is routed on a vehicle underfloor 11. The wire harness 9 is routed along the vehicle underfloor 11 while being substantially parallel thereto. The vehicle underfloor 11 is a known body, and a so-called panel member, and a through hole is formed at a predetermined position in the vehicle underfloor 11. The wire harness 9 is water-tightly inserted into the through hole.

The wire harness 9 is connected to the battery 5 via a junction block 12 provided in the battery 5. A rear end 13 of the wire harness 9 is electrically connected to the junction block 12 by a known method. A front end 14 of the wire harness 9 is electrically connected to the inverter unit 4 by a known method.

The motor unit 3 serves as both a motor and a generator. The inverter unit 4 includes an inverter and a converter. The motor unit 3 is a motor assembly including a shielded case. The inverter unit 4 is an inverter assembly including a shielded case. The battery 5 is a Ni-MH battery or a Li-ion battery, and is built as a module. A power storage device such as a capacitor can also be used as the battery 5. Insofar as the battery 5 can be used in the hybrid vehicle 1 or an electric vehicle, the battery 5 is not limited to a specific type of battery.

In FIGS. 2 and 3, the wire harness 9 is configured to include one or a plurality of high-voltage conductive paths (conductive paths) 15; an exterior member 16 that accommodates and protects the high-voltage conductive paths 15; a shielded connector 17 provided at an end of the high-voltage conductive paths 15; a boot 18 provided to straddle the shielded connector 17 and the exterior member 16; a plurality of clamps (post-installed members) 19 and 20 attached to an external surface of the exterior member 16 in a post-installation process; and a grommet 21 attached to the external surface of the same exterior member 16 in a post-installation process.

The wire harness 9 may have a configuration and a structure in which a low-voltage conductive path along with the high-voltage conductive path 15 is accommodated in and protected by the exterior member 16.

The high-voltage conductive path 15 is a high-voltage conductive path, and includes two high-voltage circuits (not specifically illustrated), and a shield member that covers the two high-voltage circuits. The two high-voltage circuits are formed to have a length required for electrical connection. The two high-voltage circuits are formed to have a long length in order for the wire harness 9 to electrically connect the inverter unit 4 and the battery 5 (the junction block 12) together (refer to FIG. 1). The high-voltage circuit includes a conductor and an insulator with which the conductor is coated.

The conductor is made of copper, a copper alloy, aluminum, or an aluminum alloy. The conductor may have either a conductor structure in which strands are intertwined, or a conductor structure (for example, which is a conductor structure of a flat-rectangular-shaped single core or a round single core, and in this case, an electric wire also has a rod shape) with the shape of a rod having a rectangular section or a round section. An insulator made of a resin material having insulting properties is provided over an external surface of the conductor using an extrusion molding method.

Examples of the high-voltage circuit include one or a plurality of known high-voltage electric wires, shielded electric wires, and busbars over each of which an insulator is provided. Another example is a high-voltage coaxial composite conductive path with a configuration in which a positive circuit and a negative circuit are coaxially provided, or a high-voltage coaxial composite conductive path with a configuration in which three or more circuits are coaxially provided.

The exterior member 16 is a tube made of resin which covers the high-voltage conductive path 15. The exterior member 16 has a length required to allow the high-voltage conductive path 15 to be inserted thereinto and accommodated therein, and a thickness required to protect the high-voltage conductive path 15. The exterior member 16 is formed to have a long length so as to straddle the front and the rear of the vehicle underfloor 11 via the vehicle underfloor 11. The material of the exterior member 16 is not limited to resin, and may be metal.

The exterior member 16 includes a flexible tubular portion 22 (22a, 22b, and 22c) as a portion being routed in a bent form, and a straight tubular portion 23 (23a and 23b) as a portion being straightly routed, and for example, the exterior member 16 is formed in the illustrated shape. The exterior member 16 is molded of resin such that a plurality of the flexible tubular portions 22 and a plurality of the straight tubular portions 23 become straight when the flexible tubular portions 22 are not flexed. The exterior member 16 has a substantially rectangular section, a substantially circular section, a substantially long circular section, a substantially elliptical section, or the like (a section shape is appropriately selected).

The flexible tubular portions 22 are disposed and formed conforming to a vehicle attachment shape (a shape of a routing destination of the wire harness, that is, the shape of a fixation target 24). Specifically, the flexible tubular portions 22 are disposed and formed conforming to sections that require the bending of the exterior member 16. Each of the flexible tubular portions 22 is formed to have a length required for bending. In the embodiment, only the flexible tubular portion 22c is formed to have a long length.

The flexible tubular portions 22 (22a, 22b, and 22c) are formed such that each of the flexible tubular portions 22 can be flexed at a desired angle when the wire harness 9 is packed, transported, or routed along a path in a vehicle (is attached and fixed to the vehicle), that is, after the wire harness 9 is manufactured (refer to FIG. 2).

Each of the flexible tubular portions 22 (22a, 22b, and 22c) can be flexed in a desired bent shape, and restored to an original non-flexed shape.

In the embodiment, the flexible tubular portions 22 (22a, 22b, and 22c) are formed in the shape of a bellows tube (insofar as the flexible tubular portions 22 are flexible, the flexible tubular portions 22 are not limited to a specific shape). Specifically, each of the flexible tubular portions 22 includes a plurality of circumferential concave portions 25 and a plurality of circumferential convex portions 26 which are consecutively but alternately formed in a direction of the tube axis (in an extension direction of the high-voltage conductive path 15).

As can be understood from the aforementioned description, each of the portions, in which the flexible tubular portions 22 (22a, 22b, and 22c) are disposed, is shaped like a corrugated tube. In other words, the exterior member 16 is partially shaped like a corrugated tube. The exterior member 16 has the portions shaped like a corrugated tube as described above, and thus the exterior member 16 is also referred to as a "corrugated tube", a "partially corrugated tube", or the like.

In contrast, the straight tubular portions 23 (23a, 23b) are formed as portions not being bent when the wire harness 9 is packed, transported, or routed in a path (the non-bent portion is a portion that is not actively formed to be flexible). Each of the straight tubular portions 23 is positioned and has a length conforming to the vehicle attachment shape (the shape of the fixation target 24).

The long straight tubular portion 23b is disposed and formed conforming to the position of the vehicle underfloor 11. The straight tubular portion 23a shorter than the straight tubular portion 23b is disposed and formed close to the front end 14 of the wire harness 9 while being positioned between the flexible tubular portions 22a and 22b, and being continuous with the flexible tubular portions 22a and 22b.

A drain hole 27 is formed in the long straight tubular portion 23b. The drain hole 27 is disposed and formed at the lowest end when the wire harness 9 is routed in a path (is attached and fixed). In the embodiment, the drain hole 27 is disposed and formed conforming to an attachment position of the clamp 20 that is a post-installed member. The drain hole 27 is formed to have a circular shape with an appropriate size in such a way as to pass through the straight tubular portion 23b. The number, the size, or the like of drain holes 27 are appropriately set.

The straight tubular portions 23 (23a and 23b) are formed in the shape of a straight tube (in a straight tubular shape). The straight tubular portions 23 are formed to have rigidity. Accordingly, the straight tubular portion 23 is referred to as a "straight tubular portion", a "rigid portion", or the like. As described above, the clamps 19 and 20 as post-installed members are attached to the straight tubular portions 23.

A known clamp is used as the clamp 19. Each of the clamps 19 includes a tube attachment portion 28, and a cantilever-like fixing portion 29 that is continuous with the tube attachment portion 28. A bolt insertion hole 30 is formed in the fixing portion 29 in such a way as to pass therethrough. The insertion hole 30 is shaped such that a stud bolt 31 provided in the fixation target 24 is capable of engaging into the insertion hole 30. The clamp 19 and the stud bolt 31 are fixation points. In the drawings, orientations of the fixing portions 29 or the stud bolts 31 may be changed for the sake of convenience.

The clamp 20 includes a tube attachment portion 32 as a portion being attached to the exterior member 16, and the cantilever-like fixing portion 29 that is continuous with the tube attachment portion 32. The tube attachment portion 32 is shaped so as to be able to cover the drain hole 27 in a state that the function of the drain hole 27 of the long straight tubular portion 23b is ensured. Specifically, in an enlarged view illustrated in the circle in FIG. 3, the tube attachment portion 32 is shaped so as to include a main tube attachment portion 33 and a drain function ensuring portion 34.

The main tube attachment portion 33 is shaped so as to surround an external surface of the straight tubular portion 23b at the position of the drain hole 27. The main tube attachment portion 33 is shaped so as not to be likely to slide in an axial direction of the straight tubular portion 23b. The main tube attachment portion 33 is formed basically in the same shape as the tube attachment portion 28 of the clamp 19. The point of difference is the drain function ensuring portion 34 being added to the main tube attachment portion 33.

The drain function ensuring portion 34 is formed as a portion that covers the drain hole 27. The drain function ensuring portion 34 is shaped so as to be able to ensure the function of the drain hole 27 when covering the drain hole 27. Specifically, the drain function ensuring portion 34 is shaped so as to include a gap 35 between the drain function ensuring portion 34 and the drain hole 27. A vehicle progress direction is deemed to be illustrated by arrow P, and the drain function ensuring portion 34 is shaped so as to include a foreign substance entry preventing portion 36 in a side of the gap 35 in the vehicle progress direction P. The drain function ensuring portion 34 is shaped so as to further include an outside communication hole 37 in the opposite side in the vehicle progress direction P. Furthermore, the drain function ensuring portion 34 is shaped so as to include a ground facing wall 38 and side walls 39.

The foreign substance entry preventing portion 36 is formed as a wall-like portion that prevents foreign substances from entering the gap 35. The ground facing wall 38 and the side walls 39 are also formed as wall-like portions that prevent foreign substances from entering the gap 35. In contrast, the outside communication hole 37 is formed open as a portion for draining water to the outside. Moisture drains from the inside of the exterior member 16 to the gap 35 via the drain hole 27, to the outside communication hole 37, and then to the outside.

The drain hole 27 and the drain function ensuring portion 34 are equivalent to structures for draining, that is, drain structures. In the embodiment, a drain structure is added to the clamp 20; however, the present invention is not limited to this configuration, and the drain structure may be added to another post-installed member. Examples of another post-installed member include a band-like member, a protector, and a grommet, and as an example, a portion like the drain function ensuring portion 34 is added to any one of the aforementioned other post-installed members.

The fixing portion 29 of the clamp 20 is formed as the same portion as that of the clamp 19. Accordingly, the fixing portion 29 of the clamp 20 is formed in such a way that there is no change in the shape of a portion engaging with the stud bolt 31.

Known products are used as the shielded connector 17, the boot 18, and the grommet 21. For this reason, detailed descriptions thereof will not be given.

The wire harness 9 with the aforementioned configuration and structure is manufactured in the following manner (not illustrated). That is, the wire harness 9 is manufactured by inserting the high-voltage conductive path 15 into one end of the exterior member 16 up to the other end thereof with the exterior member 16 being molded of resin and substantially straight throughout its entire length. The wire harness 9 is manufactured by further attaching the clamps 19 and 20 and the grommet 21 to the external surface of the exterior member 16 at predetermined positions. The wire harness 9 is manufactured by further providing the shielded connectors 17 in end portions 40 of the high-voltage conductive path 15, respectively. The wire harness 9 is manufactured by further attaching each of the boots 18 so as to straddle the exterior member 16 and the shielded connector 17.

After the manufacturing of the wire harness 9 is completed as described above, when the wire harness 9 is bent such that the predetermined flexible tubular portions 22 are folded, the wire harness 9 is completely brought into a packed state. The wire harness 9 in a packed state is compact, and the wire harness 9 is transported to a vehicle assembly site in such a compact state.

At the vehicle assembly site, the attachment of the wire harness 9 to the vehicle starts with the long portion of the wire harness 9 corresponding to the vehicle underfloor 11, that is, the straight tubular portion 23b. The attachment of the wire harness 9 starts with the long straight tubular portion 23b corresponding to the vehicle underfloor 11, and thus the attachment of the wire harness 9 starts in a state where the wire harness 9 is restrained from being flexed. In this case, the attachment of the wire harness 9 is performed with excellent workability.

After the long straight tubular portion 23b is fixed using the clamps 19 and 20 and the stud bolts 31, the remainders of the wire harness 9 are attached while the flexible tubular portions 22 of the exterior member 16 are flexed (bent). When a series of attachment operations are completed, the wire harness 9 is routed in a desired path.

As has been described with reference to FIGS. 1 to 3, the wire harness 9 includes the exterior member 16 with a tubular shape which covers the high-voltage conductive path 15, and the drain hole 27 is formed in the exterior member 16. The drain hole 27 is covered with the clamp 20, that is, a post-installed member in a state that the function of the drain hole 27 is ensured. Accordingly, it is possible to prevent foreign substances from entering the inside of the exterior member 16. When foreign substances can be prevented from entering the inside of the exterior member 16, causing the external surface of the high-voltage conductive path 15 to be scratched due to vibration or the like during traveling can be prevented.

Embodiment 2

Figure 4:
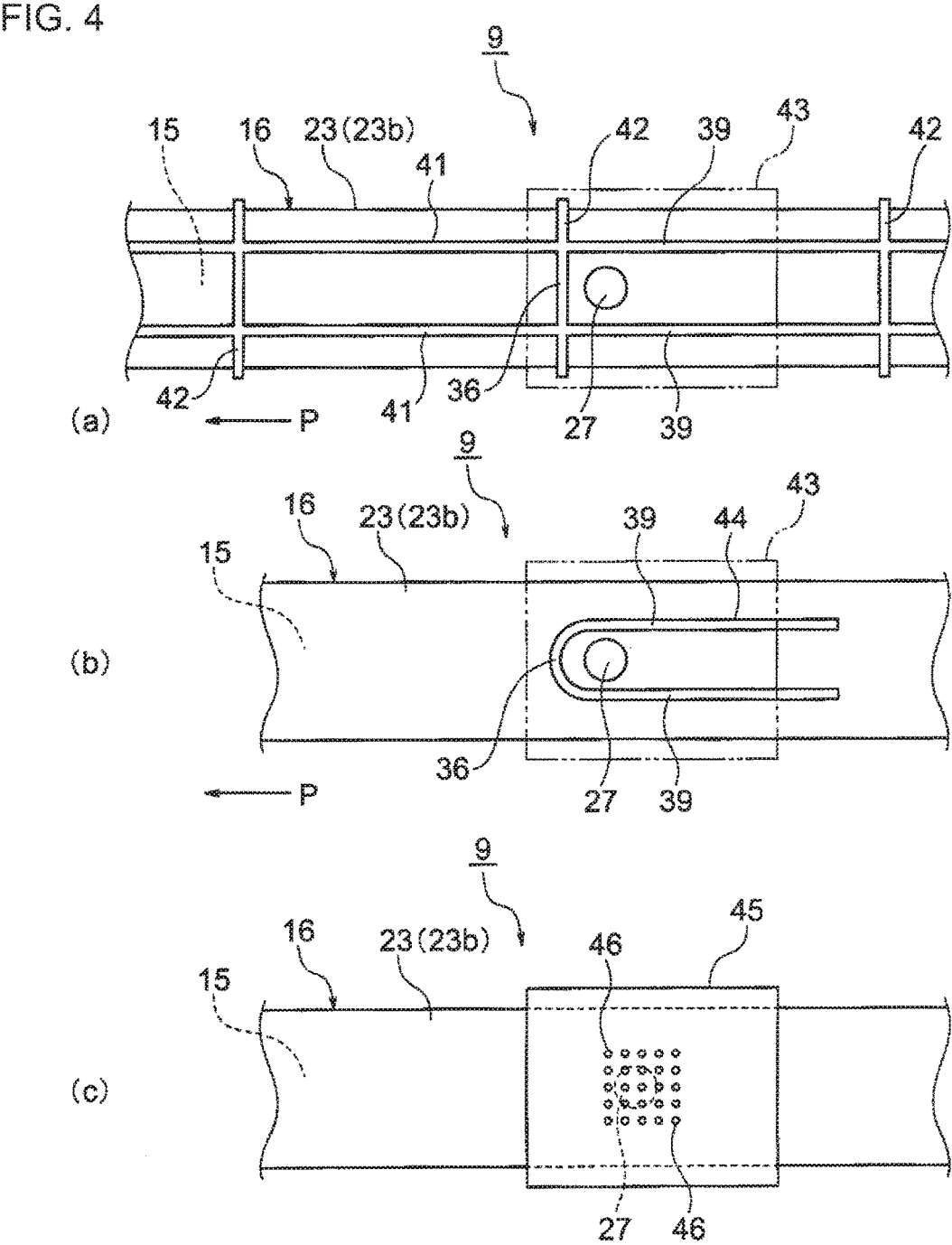
FIG. 4 is a view illustrating a drain structure in Embodiment 2.

Hereinafter, Embodiment 2 will be described with reference to the accompanying drawing. FIG. 4 shows views illustrating other examples of the drain structure. The same reference signs are basically assigned to the same configuration members as in Embodiment 1, and detailed descriptions thereof will be omitted.

As illustrated in FIG. 4(a), the long straight tubular portion 23b is provided with a plurality of ribs 41 extending straightly in the direction of the tube axis, and a plurality of ribs 42 extending in a circumferential direction of the tube. The rib 42 in the vicinity of the drain hole 27 serves as the foreign substance entry preventing portion 36, the ribs 41 continuous with the rib 42 serve as the side walls 39, and the drain hole 27 is covered with a post-installed member 43. Therefore, a gap and an outside communication hole are formed due to the heights of the ribs 41 and 42. As a result, naturally, the example illustrated in FIG. 4(a) provides the same effects as in Embodiment 1.

As illustrated in FIG. 4(b), a U-shaped rib 44 is formed in the long straight tubular portion 23b in such a way as to surround the drain hole 27. The rib 44 serves as both the foreign substance entry preventing portion 36 and the side wall 39, and the drain hole 27 is covered with the post-installed member 43, and thus a gap and an outside communication hole are formed due to the height of the rib 44. As a result, naturally, the example illustrated in FIG. 4(b) provides the same effects as in Embodiment 1. The rib 44 may be formed in the post-installed member 43.

As illustrated in FIG. 4(C), a post-installed member 45 is attached to the long straight tubular portion 23b in such a way as to cover the drain hole 27. A plurality of holes 46 smaller than the drain hole 27 are formed in the post-installed member 45. A gap and the like illustrated in the aforementioned embodiments are not formed; however, it is understood that the shape of the holes 46 is effective in restraining the entry of foreign substances. As an example, other than the small holes 46, a slit smaller than the drain hole 27 may be formed. A mesh-like portion may be formed in the post-installed member 45.

The characteristics of the wire harness in the embodiments of the present invention are collectively and briefly listed in [1] to [5] hereinbelow.

[1] In a wire harness (9) including an exterior member (16) with a tubular shape which covers a conductive path (a high-voltage conductive path 15), a drain hole (27) being formed in the exterior member (16), the drain hole (27) is covered with a post-installed member (the clamp 20) attached to the exterior member (16) in a state that a drain function is ensured.

[2] In the wire harness (9) described in [1], a gap (35) is formed between the drain hole (27) and the post-installed member (the clamp 20).

[3] In the wire harness (9) described in [2], a foreign substance entry preventing portion (36) is formed in a side of the gap (35) in a vehicle progress direction.

[4] In the wire harness (9) described in [3], an opposite side of the gap (35) in the vehicle progress direction communicates with outside via an outside communication hole (37).

[5] In the wire harness (9) described in [1], a hole (46) or a slit smaller than the drain hole (27) is formed in a portion of the post-installed member (43, 45) which corresponds to the drain hole (27).

The present invention has been described in detail with reference to the specific embodiments, and it is apparent to persons skilled in the art that modifications or corrections can be made to the present invention in various forms insofar as the modifications or the corrections do not depart from the spirit and the scope of the present invention.

This application is based on Japanese Patent Application No. 2013-129289, filed on Jun. 20, 2013, the content of which is incorporated herein for reference.

INDUSTRIAL APPLICABILITY

It is possible to provide a wire harness capable of preventing foreign substances from entering the inside of an exterior member, which is the effect of the present invention. The present invention with such an effect is effectively applied to a wire harness that is configured to include an exterior member having a drain hole.

REFERENCE SIGNS LIST

P: VEHICLE PROGRESS DIRECTION
1: HYBRID VEHICLE
2: ENGINE
3: MOTOR UNIT
4: INVERTER UNIT
5: BATTERY
6: ENGINE COMPARTMENT
7: VEHICLE REAR PORTION
8, 9: WIRE HARNESS
10: INTERMEDIATE PORTION
11: VEHICLE UNDERFLOOR
12: JUNCTION BLOCK
13: REAR END
14: FRONT END
15: HIGH-VOLTAGE CONDUCTIVE PATH (CONDUCTIVE PATH)
16: EXTERIOR MEMBER
17: SHIELDED CONNECTOR
18: BOOT
19, 20: CLAMP (POST-INSTALLED MEMBER)
21: GROMMET
22: FLEXIBLE TUBULAR PORTION
23: STRAIGHT TUBULAR PORTION
24: FIXATION TARGET
25: CONCAVE PORTION
26: CONVEX PORTION
27: DRAIN HOLE
28: TUBE ATTACHMENT PORTION
29: FIXING PORTION
30: BOLT INSERTION HOLE
31: STUD BOLT
32: TUBE ATTACHMENT PORTION
33: MAIN TUBE ATTACHMENT PORTION
34: DRAIN FUNCTION ENSURING PORTION
35: GAP
36: FOREIGN SUBSTANCE ENTRY PREVENTING PORTION
37: OUTSIDE COMMUNICATION HOLE
38: GROUND FACING WALL
39: SIDE WALL
40: END PORTION
41, 42, 44: RIB
43, 45: POST-INSTALLED MEMBER
46: HOLE

The invention claimed is:

1. A wire harness comprising:
an exterior member with a tubular shape which covers a conductive path, a drain hole being formed in the exterior member; and
a post-installed cover member attached to the exterior member and including a drain ensuring portion covering the drain hole, the drain ensuring portion including a gap portion disposed between, in a radial direction of the exterior member, the drain hole and an exterior surface of the drain ensuring portion when the cover member is attached to the exterior member,
wherein the exterior member extends through the post-installed cover member in an extending direction, and
wherein the drain ensuring portion includes an opening providing communication between the gap portion and an exterior of the post-installed cover member, the opening facing in a facing direction parallel to the extending direction.

2. The wire harness according to claim 1,
wherein the cover member includes a tube attachment portion as a portion being attached to the exterior member, and
wherein the drain ensuring portion extends farther, in the radial direction of the exterior member, than the tube attachment portion, and wherein the facing direction in which the opening faces is further perpendicular to the radial direction.

3. The wire harness according to claim 1,
wherein a foreign substance entry preventing portion is formed at a side of the gap portion, and opposite to the opening, in an opposing direction parallel to the extending direction.

4. The wire harness according to claim 3,
wherein at least one of the exterior member and the cover member is attached to a vehicle,
wherein the facing direction is opposite to a vehicle movement direction, and
wherein the foreign substance entry preventing portion is disposed in front of the opening in the vehicle movement direction.

5. The wire harness according to claim 3,
wherein the cover member includes a tube attachment portion as a portion being attached to the exterior member, and
wherein the foreign substance entry preventing portion includes a wall extending in a direction, perpendicular to the extending direction, from an exterior surface of the tube attachment portion.

* * * * *